(12) United States Patent
Lesniak et al.

(10) Patent No.: US 11,303,232 B2
(45) Date of Patent: Apr. 12, 2022

(54) FAN BRAKE CONTROL SYSTEM

(71) Applicant: Babcock & Wilcox SPIG, Inc., Barberton, OH (US)

(72) Inventors: Brian A Lesniak, Nashville, TN (US); Michael M Mahler, Hayes, VA (US); Thomas R Hendrix, Annona, TX (US); John W Stacks, III, Mansfield, TX (US); David F Johnston, Williamsburg, VA (US)

(73) Assignee: Babcock & Wilcox SPIG, Inc., Akron, OH (US)

( * ) Notice: Subject to any disclaimer, the term of this patent is extended or adjusted under 35 U.S.C. 154(b) by 0 days.

(21) Appl. No.: 16/553,540

(22) Filed: Aug. 28, 2019

(65) Prior Publication Data

US 2020/0076334 A1    Mar. 5, 2020

Related U.S. Application Data

(60) Provisional application No. 62/724,843, filed on Aug. 30, 2018.

(51) Int. Cl.
| | |
|---|---|
| *H02K 7/00* | (2006.01) |
| *H02P 3/26* | (2006.01) |
| *F16D 55/22* | (2006.01) |
| *F16D 65/16* | (2006.01) |
| *F04D 19/00* | (2006.01) |

(52) U.S. Cl.
CPC .............. *H02P 3/26* (2013.01); *F04D 19/002* (2013.01); *F16D 55/22* (2013.01); *F16D 65/16* (2013.01)

(58) Field of Classification Search
CPC ....... H02P 3/26; G05B 19/0425; G05B 19/46; F04D 19/002; F16D 55/22; F16D 65/16
See application file for complete search history.

(56) References Cited

U.S. PATENT DOCUMENTS

| | | | |
|---|---|---|---|
| 9,605,975 B2 * | 3/2017 | Foletto | G01D 5/145 |
| 2017/0138018 A1 * | 5/2017 | Beschorner | E02F 9/267 |

FOREIGN PATENT DOCUMENTS

| | | | |
|---|---|---|---|
| CN | 103161669 A | * | 6/2013 |
| CN | 103365380 A | * | 10/2013 |

\* cited by examiner

*Primary Examiner* — Karen Masih
(74) *Attorney, Agent, or Firm* — Michael J. Seymour

(57) ABSTRACT

A control system for mechanical braking devices is provided. The control system is designed to selectively slow, stop, and lock in place rotating machinery that is turning at an RPM that may be much greater than zero while helping minimize shock load on the rotating machinery. A fan brake control system is provided which can include: a fan brake; a position sensor; a microcontroller; an actuator; an operator interface; and a fan motor interface.

19 Claims, 10 Drawing Sheets

FAN BRAKE CONTROL SYSTEM

CROSS-REFERENCE TO RELATED APPLICATIONS

This application claims priority from U.S. Provisional Patent Application No. 62/724,843, filed on Aug. 30, 2018, which is incorporated by reference herein in its entirety.

BACKGROUND

Evaporative cooling towers are utilized in a myriad of applications globally to provide effective and efficient cooling. These devices provide cooling by bringing ambient air into contact with hot process water. The hot process water will naturally evaporate as it seeks to achieve equilibrium, increasing the moisture content in the air stream and reducing the temperature of the process water.

Cooling begins with the hot process water being pumped to the top of the cooling tower and then discharged into a distribution system. This distribution system spreads the water out across the tower and on top of the fill media. The fill media facilitates cooling by increasing the surface area of the water that is exposed to the air stream and suspending the water temporarily to increase the duration of interaction with the air.

In applications where water is scarce, sometimes an air-cooled condenser can be utilized in lieu of a cooling tower. In air-cooled condensers, the system is constructed with a framework of metal tubes referred to as tube bundles. Steam coming from a facility's process is routed into a steam header that spreads the steam through the tube bundles. Ambient air is then blown over the tube bundles so thermal energy can be transferred from the steam and into the ambient air.

Different from evaporative cooling, the driving force for heat transfer in these applications is the difference in temperature between the steam and the ambient air. As thermal energy is removed, the steam changes states back into water. The condensed water is then routed back to the facility.

Airflow is required for both cooling towers and air-cooled condensers in order for heat rejection to be maximized. Air flow can be generated with the use of a mechanical fan system. The type of mechanical fan system utilized is very similar in both cooling towers and air-cooled condensers.

The mechanical fan systems are most often comprised of an electric motor, driveshaft, right angle gearbox or speed reducer, and fan assembly.

There are also applications where the mechanical fan system is comprised of an electric motor and a fan assembly. The fan assembly is mounted directly to a vertical output shaft, utilizing a coupling device and other elements of the typical assembly are reduced or eliminated. In other embodiments, the mechanical fan system can include any number of components, including but not limited to a motor, drive shaft, gear box, drive belt system, pulley system, fan chassis, fan blades, etc.

There are instances where the fan assembly needs to be locked in place to prevent unintended motion of the fan. This is especially true for high-wind and storm events where the ambient conditions can cause the fan to rotate at high speeds while the electric motor is de-energized. In these conditions, the fiberglass fan stacks tend to flex inward and outward. Inevitably, the fan may make contact with the fan stack, causing damage to the assembly and potentially creating airborne hazards such as a fan blade that breaks loose and is thrown from the cooling tower, or a fan stack that is torn from the tower. A need exists to remove and/or minimize this hazard.

The fan can also spin freely while the motor is off during non-storm conditions. This creates a problem for personnel that need to be within the fan stack area for service, inspection, and maintenance work. They are exposed to the potential energy of the fan spinning and this puts them at risk. The fan may rotate unexpectedly while personnel are in the fan stack area and strike them. This could cause serious injury and potentially subject that individual to a fall hazard. A need exists to remove and/or minimize this hazard.

Unfortunately, it is common for some facilities to using improper techniques to isolate the fan's potential energy. Some of these techniques include wedging a 2×4 piece of lumber against the driveshaft to impede movement, or tying rope around parts of the mechanical system. If the 2×4 does not sufficiently stop the equipment, it may be thrown hack at the personnel trying to stop the system. This could cause tremendous injury. The 2×4 may also damage the equipment as it brings the system to a stop and induces an unsafe shock load. Similarly, rope is also a poor solution. Given the large amount of mechanical inertia, the rope may not actually keep the fan isolated if ambient conditions, such as high winds, force it to rotate. Additionally, the rope can only be installed if the system is already stopped. This would require personnel to find some other way to stop the fan. Unfortunately, some have tried to slow fan blades physically with their hand only to find themselves overwhelmed and subjected to injury and fall hazards. Thus, both methods are not ideal for minimizing safety and resulted in documented OSHA Safety violations across the country.

To address these concerns and restrict unintended movement of the fan assembly, mechanical braking (and/or locking) systems have been developed to restrict the movement of the fan assembly. A fan brake can be configured to engage one or more of the various components of a mechanical fan system to directly or indirectly isolate or stop the fan blades on the mechanical fan system from rotating. Most of these braking solutions operate manually and require personnel at the fan deck elevation to physically engage via manual turning of a wench or depression of a lever or button until such time the fan stops.

The manual brake does not fully alleviate the prior concerns identified. Manual brakes require personnel to manually actuate the assembly and the personnel must ascend to the fan deck to employ the brake. If manual actuation is performed during a storm event, the personnel will be exposed to dangerous wind conditions capable of producing the aforementioned airborne hazards. Not only does manual actuation place the safety of these personnel at risk, but in view of facilities reducing headcount in their maintenance staffs, the risk is exacerbated as fewer personnel are available to timely slow down, stop, and lock out multiple, in some cases upward of several dozen or more, cooling cells in a timely manner. As such a need exists to find a solution to the existing concern in view of personnel staffing reduction trends.

Electrical actuation of these braking devices may overcome the challenge of personnel having to climb to the top of the fan deck, but in the absence of a fan brake control system, damage to the fan system can occur. Damage can occur if the brake is applied remotely and the fan motor is called to start. The fan motor would work against the brake in this situation. If the fan motor overcomes the brake, then the brake and the mechanical fan system could be damaged as the motor breaks free of the locking device. If the fan motor does not overcome the brake then the motor could overheat, damaging the motor and creating an unsafe environment around the motor. The brake could also be applied when the fan motor is actively running, which could also damage the mechanical fan system as the system would be actively rotating while the brake would attempt to stop it. The brake is not meant for this instantaneous application and may become damaged as it tries to restrict the movement of the highly energized rotating system. Furthermore, if the brake is successful in stopping the energized system, a tremendous shock load could be induced into the system. This shock load could damage the gearbox, break the driveshaft, or cause any number of issues in the system.

Neither electrical actuation nor mechanical actuation of a brake assembly provide a way to safely slow the assembly if it is currently spinning. These fan assemblies can spin at speeds even higher than their intended operating speed in the right ambient conditions (e.g., windy conditions). In such a ease, these fans cannot be locked out and secured with existing braking solutions. Existing solutions require the assembly to be stopped (or nearly stopped), because inducing a brake improperly at these high speeds could impose a harmful shock load on the mechanical components. This shock loading has been proven to break driveshafts, damage gearbox internals, and cause failures in parts of the mechanical fan system.

Brake position engage or disengaged) is also critical if the device is remotely actuated. Without brake status information, the brake could be assumed to be engaged, when it is not. Alternatively, the brake could be engaged when personnel at the plant believe it is disengaged. Either situation could cause damage or an unsafe condition if the electric fan motor is started or is currently running. This damage would be the same shock loading that has been discussed above.

The brake must be capable of remaining locked in place if applied during an emergency or storm event. During such events, electricity could be lost locally, or at the facility as a whole. Loss of electricity is not an issue for the manual brake, as manual brakes do not require electricity. However, loss of electricity could present a challenge for electric brakes utilizing a solenoid for braking. Electricity must be applied to the solenoid to keep it locked or unlocked, and thus keep the brake engaged or disengaged. This means that brake position could change unintentionally if electricity is lost. Furthermore, requiring continuous electricity for operation (i.e., to keep the solenoid locked) is inefficient and could be a significant parasitic load for a facility with a large amount of brakes.

Various styles of fan brakes have been developed for and utilized in the cooling tower industry. Typically, the fan brake is mounted on the driveshaft between the electric motor and gearbox.

One example of a brake applied to cooling tower fans is a drum brake. A brake drum is mounted on the driveshaft such that a pair of friction pads may contact the drum. The drum brake is spring applied and is available in versions that can be released by either electrohydraulic, electromagnetic, hydraulic, or pneumatic action. Drum brakes work for holding/emergency stop applications that do not generate extreme heat or high shaft speed in normal operation. For example, if application using a variable frequency vector drive to control shaft speed down to almost zero RPM prior to application of the brake, the drum brake is suitable. This is a result of low rubbing speed and low braking heat generation.

What is needed is a brake that overcomes the limitations of the drum brake and provides a control system that will automatically slow, stop, and lock in place rotating machinery without introducing shock load when turning at RPMs much greater than zero.

Another example of brakes currently found on cooling towers is a disc style manual fan brake. The manual fan brake utilizes a pair of brake pads arranged so that a rotor assembly mounted on the driveshaft runs between the brake pads. Applying the fan brake presses the brake pads on the rotor, increasing the friction on the rotor, slowing or stopping the fan. Releasing the disc style fan brake reduces the friction and allows the fan to rotate.

The disc style fan brake is operated by means of a manual actuator that is turned with a wrench. Turning the manual actuator in one direction moves the brake pads closer together applying the brake pads to the rotor and slowing or stopping the fan. Turning the manual actuator in the opposite direction moves the brake pads further apart releasing the rotor and allowing the fan to rotate. The disc style fan brake is continuously variable in that an infinite number of brake and rotor friction settings can be obtained with the manual actuator. In addition, once the wrench is removed from the manual actuator the disc style fan brake holds its last position without the need to maintain power. The disc style fan brake can fully lock the rotor by turning the manual actuator in the proper direction and tightening the manual actuator to a specified torque. This provides repeatability as the disc style fan brake is always similarly locked, holding the fan in place.

What is needed is a system and method for selectively reducing and/or suspending the circumferential momentum of fans, and particularly to fans utilized for mechanical draft evaporative cooling towers and air-cooled condensers.

SUMMARY

In one embodiment, a fan brake control system is provided, the system comprising: a fan brake; a position sensor; a microcontroller; an actuator; an operator interface; and a fan motor interface.

In one embodiment, a method of fan brake control is provided, the method comprising: providing: a fan brake; a position sensor; a microcontroller; and an actuator; calibrating a position of the fan brake; receiving a brake open command; confirming that the fan brake is not already open; sending a signal to the actuator to rotate towards an open position; counting gear teeth in the actuator; and sending a signal to stop rotating upon reaching a preset gear teeth count.

In one embodiment, an automated manual fan brake is provided, the brake comprising: a rotor connected to a driveshaft, wherein the driveshaft is operatively connected to a fan assembly; an electric actuator including a rotating actuator shaft; and at least one brake pad; wherein the actuator shaft is connected to the at least one brake pad, and wherein the actuator causes the at least one brake pad to engage or disengage the rotor; and wherein the actuator shaft includes a manual override input to enable a wrench to manually turn the actuator shaft and cause the at least one brake pad to engage or disengage the rotor.

BRIEF DESCRIPTION OF THE DRAWINGS

The accompanying figures, which are incorporated in and constitute a part of the specification, illustrate various example apparatuses and systems, and are used merely to illustrate various example embodiments. In the figures, like elements bear like reference numerals.

DETAILED DESCRIPTION

Figure 1:
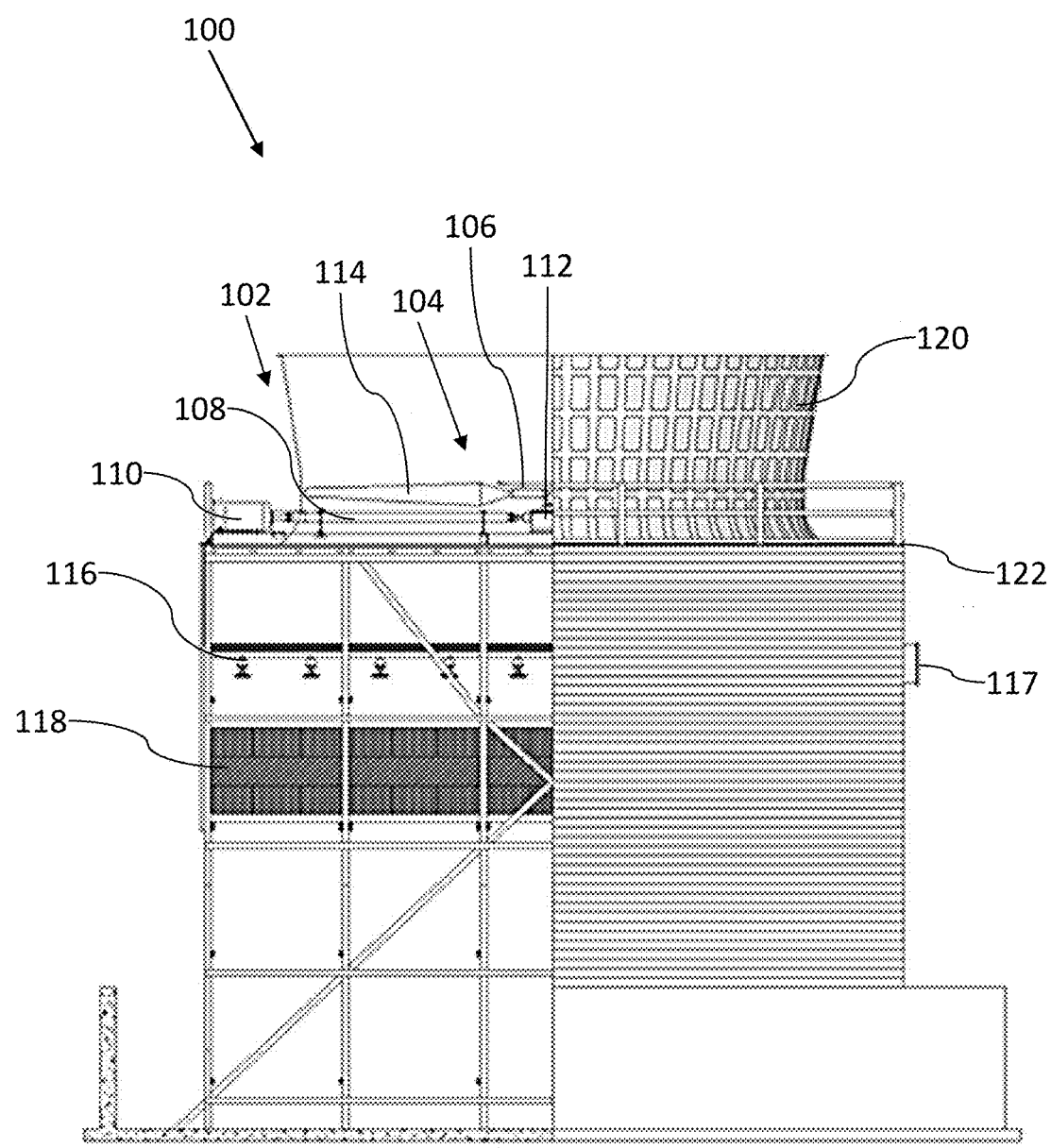
FIG. 1 illustrates a partial cutaway view of an example arrangement of a mechanical draft cooling tower 100.

FIG. 1 illustrates a partial cutaway view of a mechanical draft cooling tower 100. Cooling begins with the hot process water being pumped to the top of cooling tower 100, entering water inlet 117 of water distribution system 116. The hot process water is discharged from distribution system 116. Distribution system 116 spreads the water out across tower 100 and on top of fill media 118. Fill media 118 facilitates cooling by increasing the surface area of the water that is exposed to the air stream and suspending the water temporarily to increase the duration of interaction with the air.

There must be airflow through cooling tower 100 to generate the maximum evaporative cooling effect. Air flow can be generated with the use of a mechanical fan system 102, included in mechanical draft cooling tower 100.

The mechanical fan systems 102 in mechanical draft cooling towers 100 can be installed near the base of the cooling tower and drive air up through the cooling tower (forced draft system), or they can be installed on top of the cooling tower (induced draft system) to pull air through the system, in large field-erected applications the systems are most commonly induced draft type, installed on top of the cooling tower. The induced draft system design aids in driving the saturated exit air upward, and reduces the opportunity for recirculation of air that can compromise cooling tower performance.

In large cooling applications (i.e. power plants, industrial facilities, paper mills, chemical plants, HVAC, etc.) cooling towers 100 can be very large structures. Cooling towers 100 may be comprised of a plurality of individual units, typically known as cells. Each cell may have its own mechanical fan system 102 and water distribution system 116. The overall cooling tower can be made up of multiple cells, in many instances being at least 30 ft. (9.144 m) wide by 30 ft. (9.144 m) long by 30 ft. (9.144 m) tall, or larger.

Induced draft type, mechanical cooling towers' fan systems 102 are most often comprised of an electric motor 110, a driveshaft 108, a right angle gearbox 112 or speed reducer, and a fan assembly 104, in this common approach, the majority of the assembly is surrounded by a fan stack 120. Fan stack 120 is a structure, typically fiberglass, that surrounds fan assembly 104 and varies in height (typically 6 ft. (1.829 m) to 18 ft. (5.486 m)). The aforementioned components are usually on top of the structure at an elevation known as the fan deck 122.

The output shaft (not shown) of electric motor 110 may connect to driveshaft 108. Driveshaft 108 may extend through fan stack 120 and may connect to right-angle gearbox 112. An axle may extend from right-angle gearbox 112 to a fan hub 106. At least one fan blade 114 is connected to fan hub 106.

The induced draft mechanical system may alternatively include only electric motor 110 and fan assembly 104, without driveshaft 108, gear box 112, or a speed reducer. In such an embodiment, fan assembly 104 is mounted directly to a vertical output shaft (not shown), utilizing a coupling device. In other embodiments, the fan system can include a belt and pulley drive system, with a motor rotating a first pulley of the belt drive system, which drives a second pulley connected to the fan assembly.

The mechanical systems vary in size with the size of each cell and each cooling tower 100. Electric motor 110 may be as small as 5 horsepower (3.7 kW) and as large as 350 horsepower (261.0 kW). The fan size may vary, with some as small as 3 ft. (0.914 m) in diameter and others as large as 40 ft. (12.192 m) in diameter. This variation makes every installation different, each however containing a rotating fan with a tremendous amount of energy and rotational torque.

Figure 2:
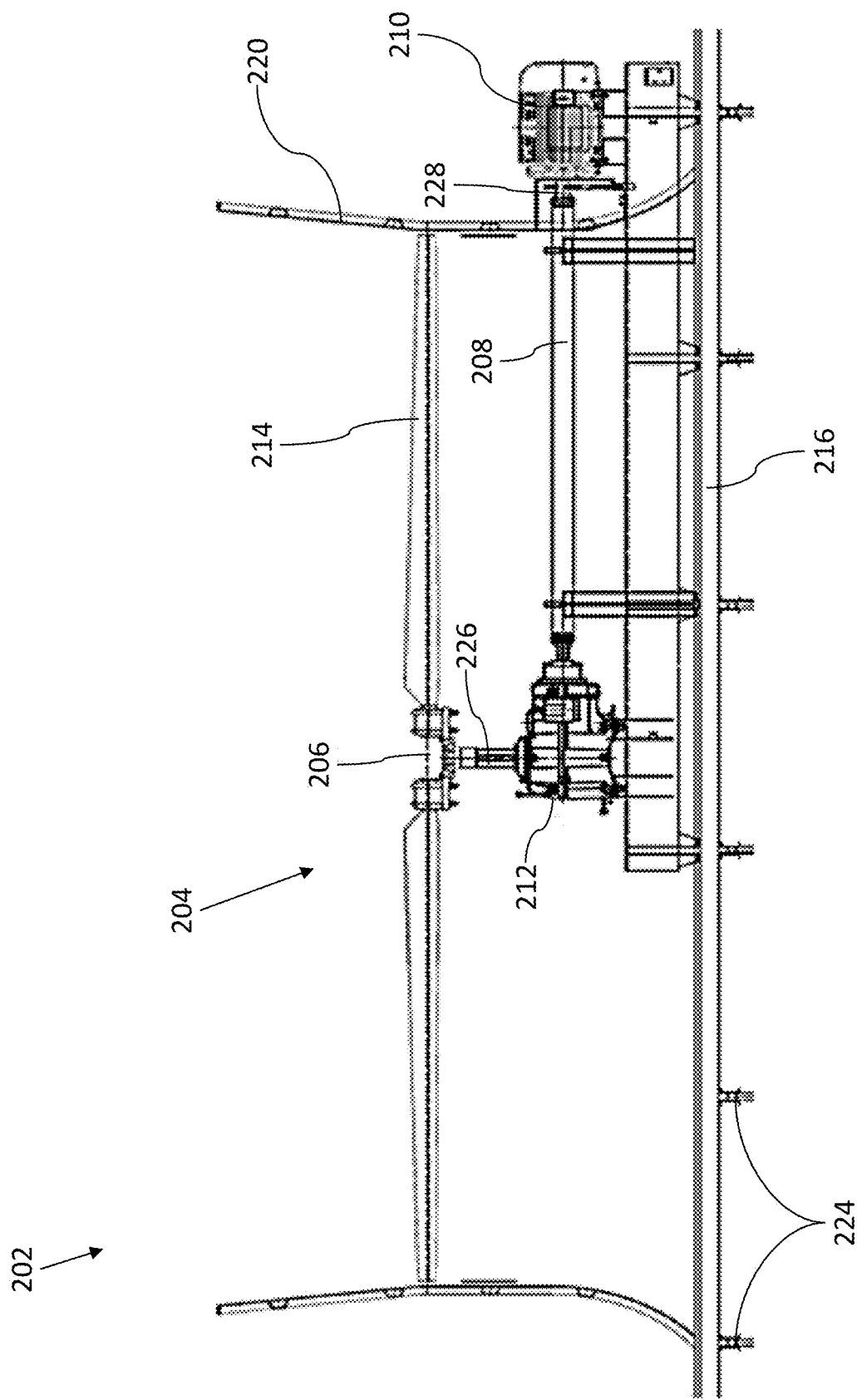
FIG. 2 illustrates a sectional view of an example arrangement of a mechanical fan system 202 for a mechanical draft cooling tower.

FIG. 2 illustrates a sectional view of an example arrangement of a mechanical fan system 202 for a mechanical draft cooling tower. System 202 may include a fan assembly 204, including a fan hub 206 and at least one fan blade 214 extending from fan hub 206. System 202 may include an electric motor 210, a drive shaft 208, and a right angle gearbox 212 or speed reducer. Fan assembly 204 may be surrounded at least partially by a fan stack 220.

Electric motor 210 may include a motor output shaft 228, which may be connected to driveshaft 208. Driveshaft 208 may be connected to gearbox 112, such that electric motor 210 causes output shaft 228 to rotate, which in turn causes driveshaft 208 to rotate, which in turn causes a fan axle 226 extending from gearbox 212 to hub 206 to rotate. As a result, electric motor 210 causes fan assembly 204 to rotate.

Also illustrated is a water distribution system 216, which may include a plurality of nozzles 224 for distributing process water within fan stack 220.

Figure 3:
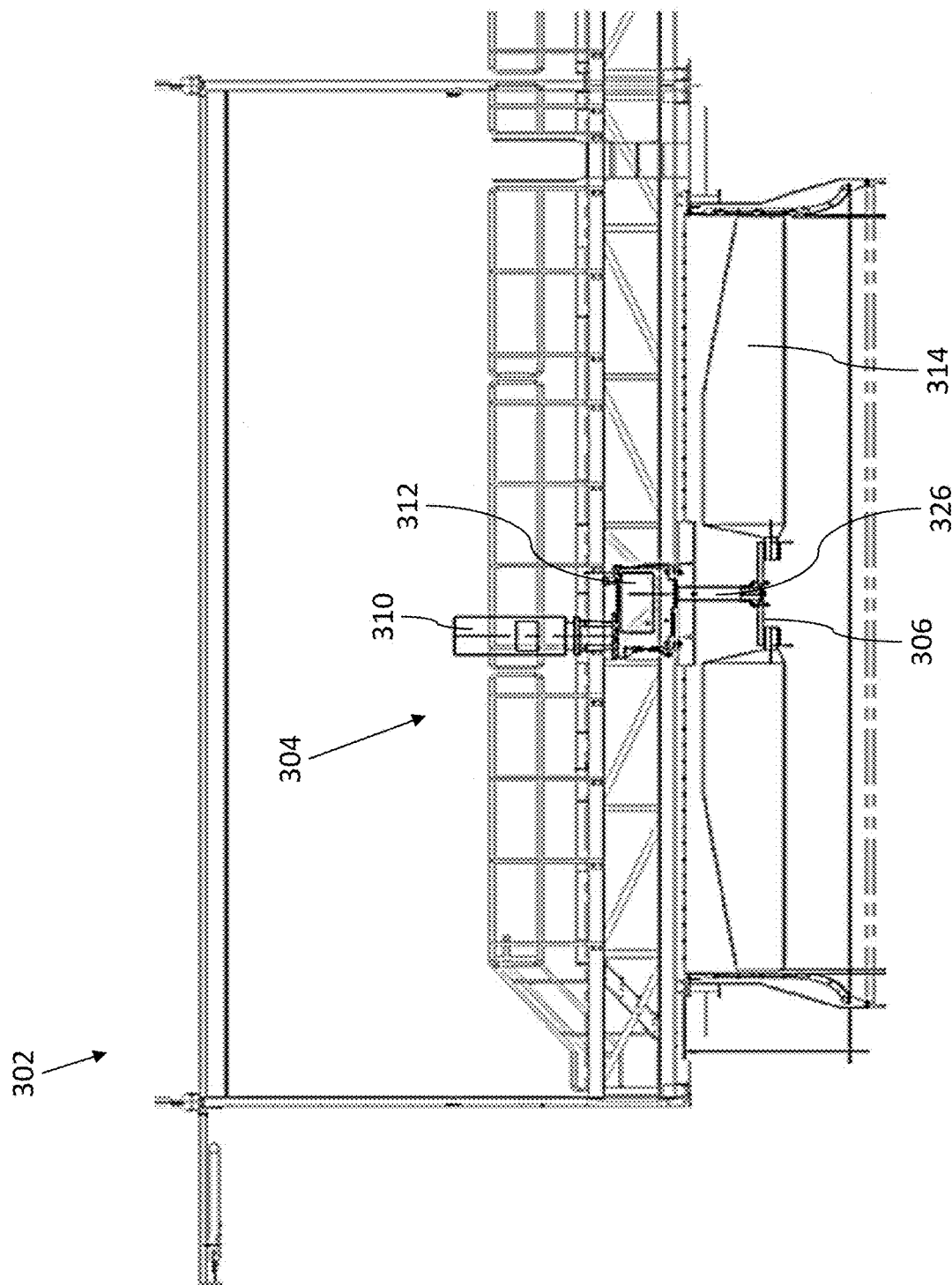
FIG. 3 illustrates a sectional view of an example arrangement of a mechanical fan system 302 for an air-cooled condenser.

The same nuances and challenges solved by the innovations disclosed herein may also exist in air cooled condensers. FIG. 3 illustrates a sectional view of an example arrangement of a mechanical fan system 302 for an air-cooled condenser. Air cooled condensers may use mechanical equipment nearly identical to that of a cooling tower (such as tower 100). Air cooled condensers may utilize dry cooling as a method to cool process water in lieu of wet, evaporative cooling. To drive airflow across the cooling coils, air cooled condenser systems make use of similar electric motors (such as electric motor 310), fan assemblies (such as fan assembly 304), and gearboxes (such as right angle gearbox 312). Fan assembly 304 may include a fan hub 306 connected to at least one fan blade 314. Fan hub 306 may be connected to gearbox 312 by a fan axle 326 extending therebetween, such that rotation of electric motor 310 causes gearbox 312 to rotate, which in turn causes fan axle 326, hub 306, and blades 314 to rotate.

An example of brakes currently found on cooling towers is the disc style manual fan brake. The disc style manual fan brake may utilize a pair of brake pads arranged so that a rotor assembly mounted on the driveshaft runs between the brake pads. Applying the disc style fan brake increases the friction on the rotor, slowing or stopping the fan. Releasing the disc style fan brake reduces the friction and allows the fan to rotate.

Existing disc style manual fan brakes may be operated by a manual actuator that is turned with a wrench. Turning the manual actuator in one direction moves the brake pads closer together applying the fan brake to the rotor and slowing or stopping the fan. Turning the manual actuator in the opposite direction moves the brake pads further apart releasing the fan brake from the rotor and allowing the fan to rotate. The disc style manual fan brake may be continuously variable in that an infinite number of brake and rotor friction settings can be obtained with the manual actuator. In addition, once the wrench is removed from the manual actuator, the fan brake holds its last position without the need to maintain power. The fan brake may fully lock the rotor by turning the manual actuator in the proper direction and tightening the manual actuator to a specified torque. This may provide repeatability as the fan brake is always similarly locked, holding the fan in place.

To improve upon the aforementioned disc style manual fan brake, a system is disclosed to add intelligence to the disc style fan brake while maintaining the ability to operate the disc style fan brake manually if desired. A control system is disclosed, wherein the control system is designed to selectively slow, stop, or lock into place rotating machinery that is turning at an RPM that may be much greater than zero while helping minimize shock load. Such a system may protect from harm both personnel and equipment. The control system may be adaptable to machinery of different size and mass. The control system may also be adaptable to other brakes or lock out devices that are operated mechanically, electrically, pneumatically, or with hydraulics.

Figure 4:
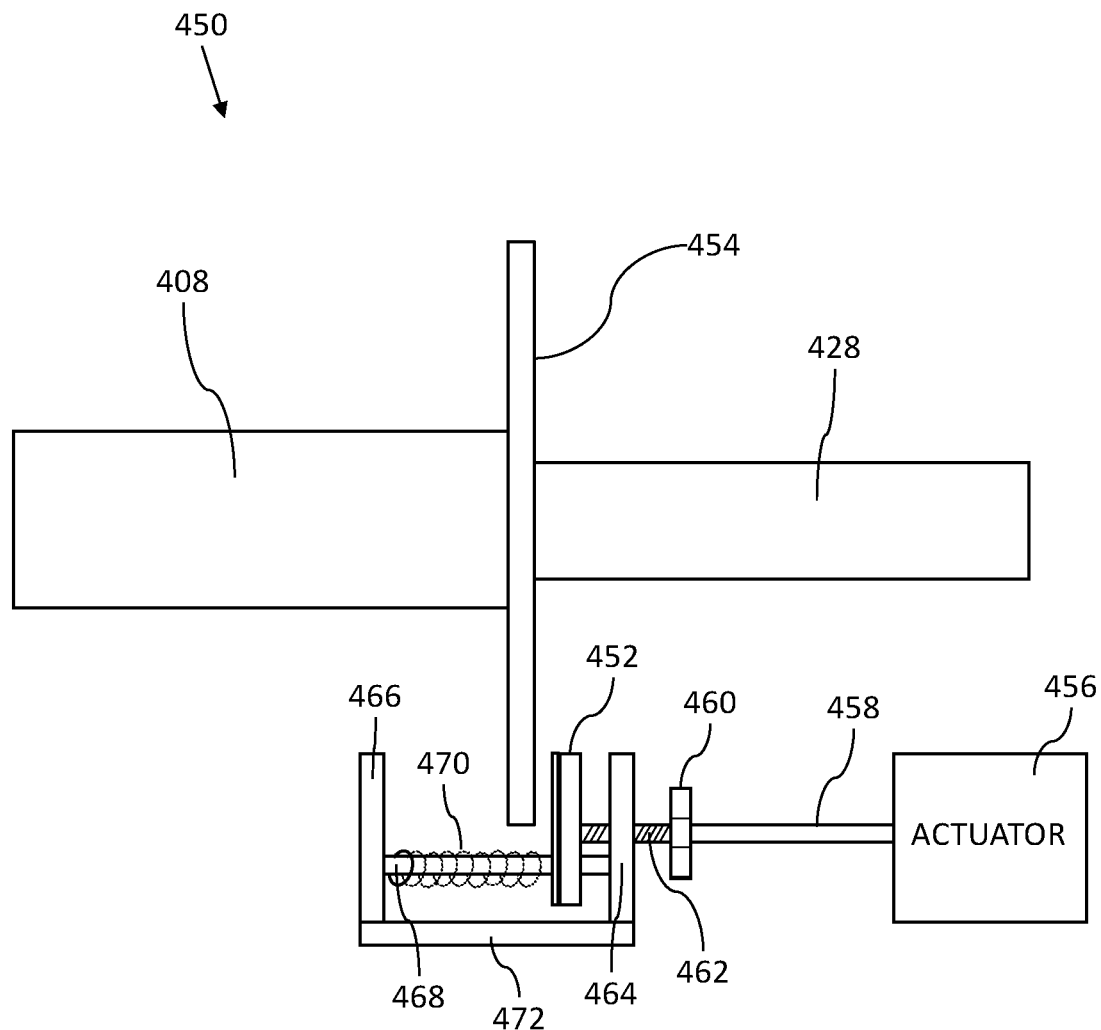
FIG. 4 illustrates an elevational view of an example arrangement of an automated manual fan brake 450.

FIG. 4 illustrates an elevational view of an example arrangement of an automated manual fan brake 450. Fan brake 450 may include a rotor 454. Rotor 454 may be substantially disc-shaped.

At least one shaft may be connected to rotor 454. At least one of a driveshaft 408 and a motor output shaft 428 may be connected to rotor 454, and rotor 454 may rotate with one or both. Rotor 454 may be connected to both motor output shaft 428 and driveshaft 408, on opposite sides of rotor 454, and motor output shaft 428, drive shaft 408, and rotor 454 may rotate together in a 1:1 ratio. Drive shaft 408 is operatively connected to a fan assembly (not shown).

Brake 450 may include at least one brake pad 452 in proximity with and configured to engage rotor 454. Similar to the manual fan brake described above, the at least one brake pad 452 may selectively extend into contact with and retract out of contact from rotor 454, to selectively apply braking force and remove braking force (respectively) to and from rotor 454 and at least one of driveshaft 408 and output shaft 428. Brake 450 may include two brake pads 452, with one oriented on a proximal side of rotor 454, and the other oriented on the distal side of rotor 454. The two opposing brake pads 452 may selectively extend into contact with rotor 454 to exert braking force upon rotor 454.

Brake 450 may include an actuator 456. Actuator 456 may include any of a variety of actuators, including for example any of electrically-powered, pneumatically-powered, and hydraulically-powered actuators.

Actuator 456 may rotate or translate an actuator shaft 458. Actuator shaft 458 may be connected to at least one brake pad 452 to cause at least one brake pad 452 to selectively translate into and out of contact with rotor 454, to selectively apply and remove braking force to and from rotor 454.

Where actuator 456 rotates actuator shaft 458, actuator shaft 458 includes shaft threads 462. Shaft 458 may pass through a threaded aperture in a proximal brake frame member 464, which may support and engage shaft 458. Proximal brake frame member 464 may include female threads that engage male shaft threads 462. As such, rotation of shaft 458 may cause translation of shaft 458 relative to proximal brake frame member 464, which in turn results in translation of brake pad 452 relative to proximal brake frame member 464. Such translation may selectively place brake pad 452 into and out of contact with rotor 454.

Proximal brake frame member 464 may be connected to a distal brake frame member 466 via a base member 472. Proximal brake frame member 464 and distal brake frame member 466 may be oriented on opposite sides of rotor 454. In one embodiment, distal brake frame member 466 includes a second brake pad, configured to apply braking force to rotor 454 opposite the illustrated brake pad 452. For example, base member 472 may translate in a direction parallel to actuator shaft 458, thus allowing brake pad 452 and a second brake pad (not shown) oriented on distal brake frame member 466 to engage rotor 454 in a pinching manner.

Brake pad 452 may slide and translate (parallel to actuator shaft 458) on at least one brake pad guide member 468. At least one guide member 468 may extend between proximal brake frame member 464 and distal brake frame member 466. A biasing member 470 may be oriented generally between distal brake frame member 466 and brake pad 452 to bias brake pad 452 and distal brake frame member 466 away from one another to ensure release of brake pad(s) 452 from rotor 454 when desired (e.g., when actuator rotates shaft 458 so as to pull brake pad 452 away from rotor 454). Biasing member 470 may be a spring. Biasing member 470 may be a coil spring extending around and along guide member 468.

To allow a manual override of actuator 456 in the event of an electric power failure, equipment failure, or other damage to brake 450, a manual override input 460 may be oriented on actuator shaft 458. Manual override input 460 may permit a user to manually rotate actuator shaft 458 (e.g., using a wrench where manual override input 460 is hexagonal, square, or any shape having opposing parallel sides) to cause brake pad(s) 452 to engage or disengage rotor 454.

Figure 5:
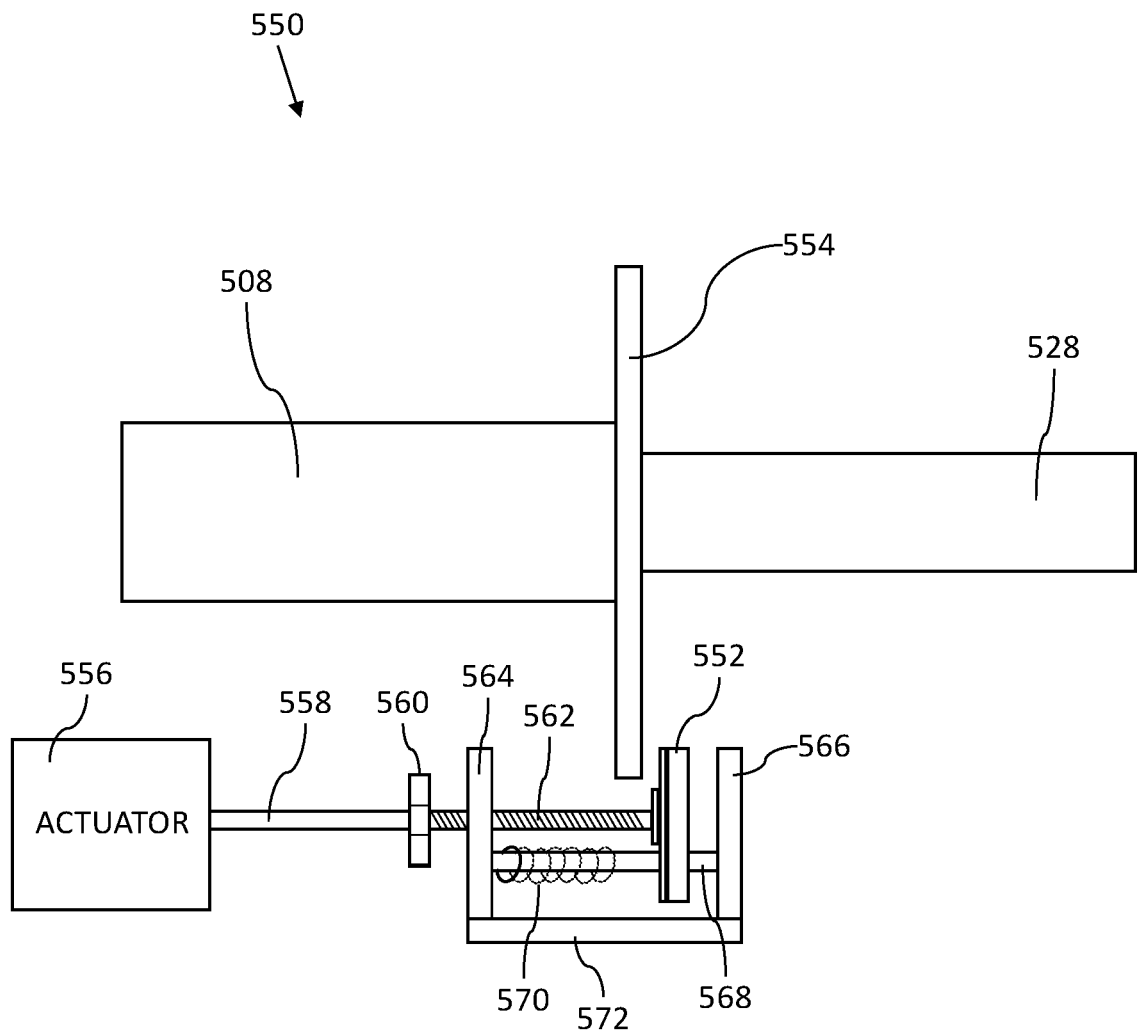
FIG. 5 illustrates an elevational view of an example arrangement of an automated manual fan brake 550.

FIG. 5 illustrates an elevational view of an example arrangement of an automated manual fin brake 559. Brake 550 is substantially similar in operation to brake 440, except as noted specifically below.

Brake 550 may include a rotor 554 connected to at least one of a motor output shaft 528 and a driveshaft 508. In other embodiments, the fan brake 550 can engage any suitable portion of the fan system including the output shaft 528, driveshaft 508, gearbox 112, or fan assembly 104 (shown in FIG. 1).

Brake 550 may include an actuator 556 connected to an actuator shaft 558. Actuator shaft 558 may include shaft threads 562, which engage threads in a proximal brake frame member 564. Brake 550 may include a base member 572 connecting proximal brake frame member 564 with a distal brake frame member 566. Base member 572 may slide parallel to actuator shaft 558. A brake pad guide member 568 may extend between proximal brake frame number 564 and distal brake frame member 566.

Similar to brake 450, actuator 556 may cause at least one brake pad 552 to translate into and out of contact with rotor 554. However, contrary to the design of brake 450, brake 550 pulls at least one brake pad 452 into contact with rotor 554, rather than push.

Brake 550 may include a biasing member 570 configured to bias brake pad 552 away from rotor 554.

Brake 550 may include a manual override input 560 oriented on actuator shaft 558.

Figure 6:
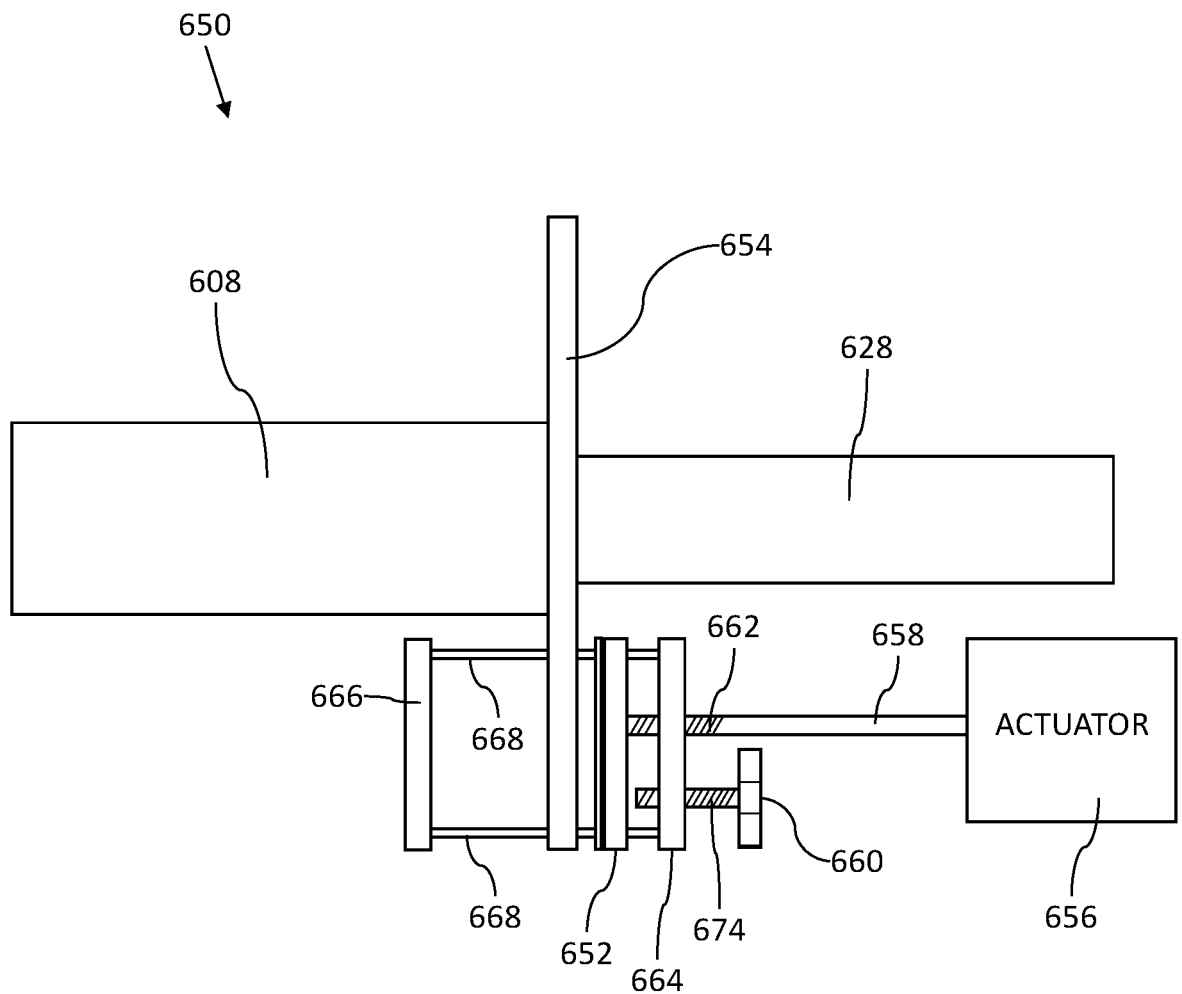
FIG. 6 illustrates a plan view of an example arrangement of an automated manual fan brake 650.

FIG. 6 illustrates a plan view of an example arrangement of an automated manual fan brake 650. Brake 650 is substantially similar in operation to brake 440, except as noted specifically below.

Brake 650 may include a rotor 654 connected to at least one of a motor output shaft 628 and a driveshaft 608.

Brake 650 may include an actuator 656 connected to an actuator Shaft 658. Actuator shaft 658 may include shaft threads 662, which engage threads in a proximal brake frame member 664. Brake 650 may include a base member connecting proximal brake frame member 664 with a distal brake frame member 666. Base member may slide parallel to actuator shaft 658. A plurality of brake pad guide members 668 may extend between proximal brake frame member 664 and distal brake frame member 666.

Similar to brake 450, actuator 656 may cause at least one brake pad 652 to translate into and out of contact with rotor 654. Actuator 656 may push at least one brake pad 652 into contact with rotor 654.

Brake 650 may include a manual override input 660. However, unlike brake 450, manual override input 669 is not oriented on actuator shaft 658, but rather, is separate from actuator shaft 658. Manual override input 660 may include manual override input threads 674, configured to engage threads within proximal brake frame member 664. In such an embodiment, where actuator 656 is unable to actuate brake pad 652 due to electric power loss, equipment failure, or the like, manual override input 660 may be able to manually actuate at least one brake pad 652, for example by use of a wrench to rotate manual override input 660.

Figure 7:
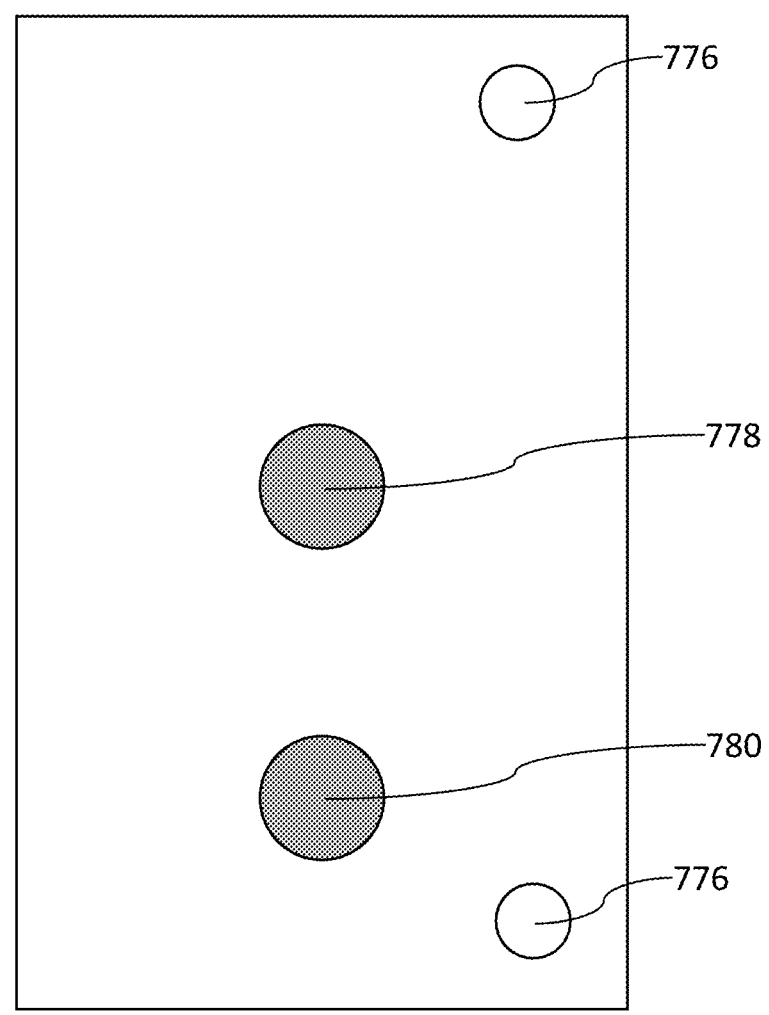
FIG. 7 illustrates a plan view of an example arrangement of a brake pad 652 for use with an automated manual fan brake 650.

FIG. 7 illustrates a plan view of an example arrangement of brake pad 652 for use with an automated manual fan brake 650. Brake pad 652 may include at least one guide member aperture 776 to permit at least one guide member 668 (see FIG. 6) to pass through brake pad 652. Brake pad 652 may include at least two guide member apertures 776 oriented generally on opposite ends of brake pad 652.

Brake pad 652 may include an actuator shaft engagement element 778. Actuator shaft engagement element 778 may connect brake pad 652 to actuator shaft 658 (see FIG. 6) to permit actuator shaft 658 to cause brake pad 652 to translate toward and from rotor 654 (see FIG. 6).

Brake pad 652 may include a manual override shaft engagement element 780. Manual override shaft engagement element 780 may connect brake pad 652 to manual override input 660 (see FIG. 6) to permit manual override input 660 to cause brake pad 652 to translate toward and from rotor 654 (see FIG. 6).

Figure 8:
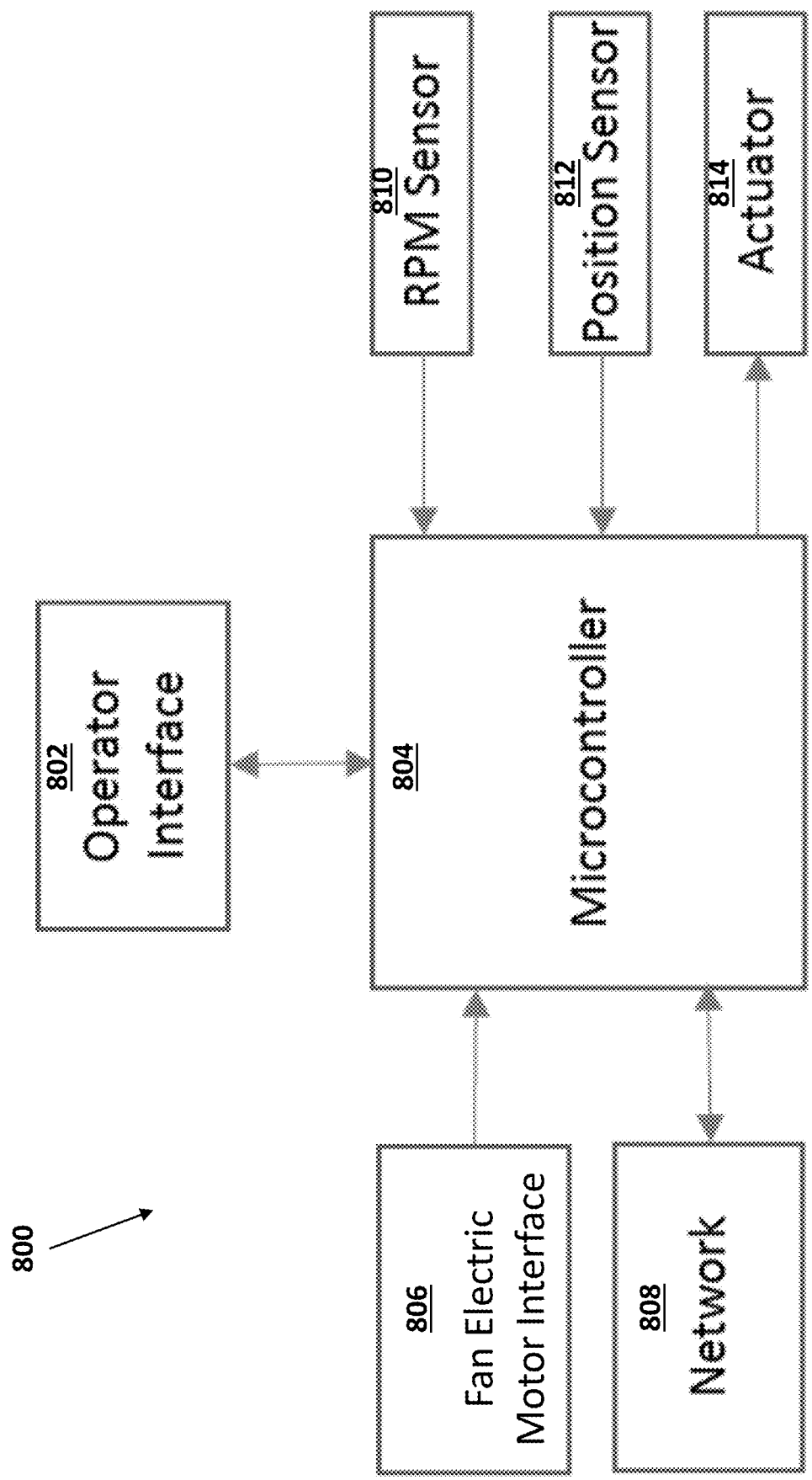
FIG. 8 illustrates a block diagram identifying components of a fan brake control system 800.

FIG. 8 illustrates a block diagram identifying components of a fan brake control system 800.

A microcontroller 804 operates the fan brake by generating signals to an actuator 814. Microcontroller 804 is responsive to a predetermined software program and makes decisions based on a combination of operator set points and feedback from multiple sensors. The microcontroller also communicates to an operator interface 802 to provide fan brake status information and receive operator set point data. In addition, the microcontroller may communicate with an external network 808 to provide the capability of uploading new programs, receiving set point data, and/or providing remote diagnostics and trouble shooting.

Operator interface 802 includes a brake open and brake close push button switch, a brake opened and brake closed indicator light, and a status indicator light. A touch screen operator interface 802 with digital display may be utilized. Operator interface 802 may provide for local control of the fan brake and the setting of pre-determined parameters.

An electric motor may be used for actuator 814. The electric motor can include gearing to rotate the manual actuator (actuation shaft) of the manual fan brake in either direction responsive to signals from microcontroller 804. This relationship between actuator 814 and microcontroller 804 automates the rotation of the manual actuator (actuation shaft). However, the ability to rotate the manual actuator (actuation shaft) with a wrench is retained.

A hall effect gear tooth sensor is used for a position sensor 812. Position sensor 812 communicates to microcontroller 804 ho much the manual actuator (actuation shaft) has been rotated by the electric motor (actuator 814) and therefore the degree of brake engagement. Position sensor 812 performs this function by counting gear teeth. Position sensor 812 is mounted on the manual fan brake to sense the rotation of the gears turning the manual actuator (actuation shaft). Other applicable sensors for use as the position sensor may include, but are not limited to: variable reluctance sensors, magneto-resistive sensors, and quadrature gear tooth sensors.

A hall effect gear tooth sensor can be used for an RPM sensor 810. RPM sensor 810, while optional, provides the added capability of indicating to microcontroller 804 that the fan driveshaft is rotating. This data can also displayed for the operator. RPM sensor 810 is mounted on the manual fan brake to sense the rotation of the rotor or driveshaft. Other applicable sensors for use as the RPM sensor may include, but are not limited to: inductive sensors, optical sensors, proximity sensors.

A relay is used for a fan electric motor interface 806. Fan electric motor interface 806 communicates to microcontroller 804 that the main drive motor (electric motor) for the cooling tower fan is on or running.

When power is first applied to control system 800, microcontroller 804 does not know the position of the fan brake or the relative friction between the brake pad(s) and the rotor. For example, even if the last position was memorized in non-volatile memory, it is possible that the manual actuator was turned by an operator with a wrench changing the fan brake position with the power off. Therefore, control system 800 first calibrates to accurately determine the fan brake position.

At power-up, no signal is applied to actuator 814 and an appropriate alarm signal is communicated to the network 808 and operator interface 802 indicating that control system 800 is not ready.

Upon receiving a signal to open or close the fan brake, microcontroller 804 starts the calibration process by sending a signal to the electric motor actuator 814. Position sensor 812 counts the number of gear teeth as they pass due to the rotation of the manual actuator (actuation shaft).

If a pre-determined number of gear teeth are counted by position sensor 812, then the true position of the brake has been successfully determined. Microcontroller 804 then sends the appropriate signal to electric motor actuator 814 to go to the commanded position (open or closed). The alarm signal is then cleared, and the appropriate open or closed signal is generated.

If a pre-determined number of gear teeth are not counted by position sensor 812, then microcontroller 804 sends the appropriate signal to electric motor actuator 814 to reverse direction. Position sensor 812 again counts the number of gear teeth as they pass due to the rotation of the manual actuator (actuation shaft). If a pre-determined number of gear teeth are counted by position sensor 812, then the true position of the fan brake has been successfully determined. Microcontroller 804 then sends the appropriate signal to electric motor actuator 814 to go to the commanded position (open or closed). The alarm signal is then cleared, and the appropriate open or closed signal is generated.

If this sequence of operating electric motor actuator 814 in both directions does not result in a pre-determined number of gear teeth being counted by position sensor 812, then the true position of the fan brake has not been successfully determined. The alarm signal and the not ready signal are then maintained. This is a fault condition requiring service of the fan brake.

This sequence acts to provide automatic fault detection of the control system and fan brake. In addition, the sequence acts to provide accurate positioning of the fan brake and thereby relative friction between the brake pads and rotor.

Figure 9:
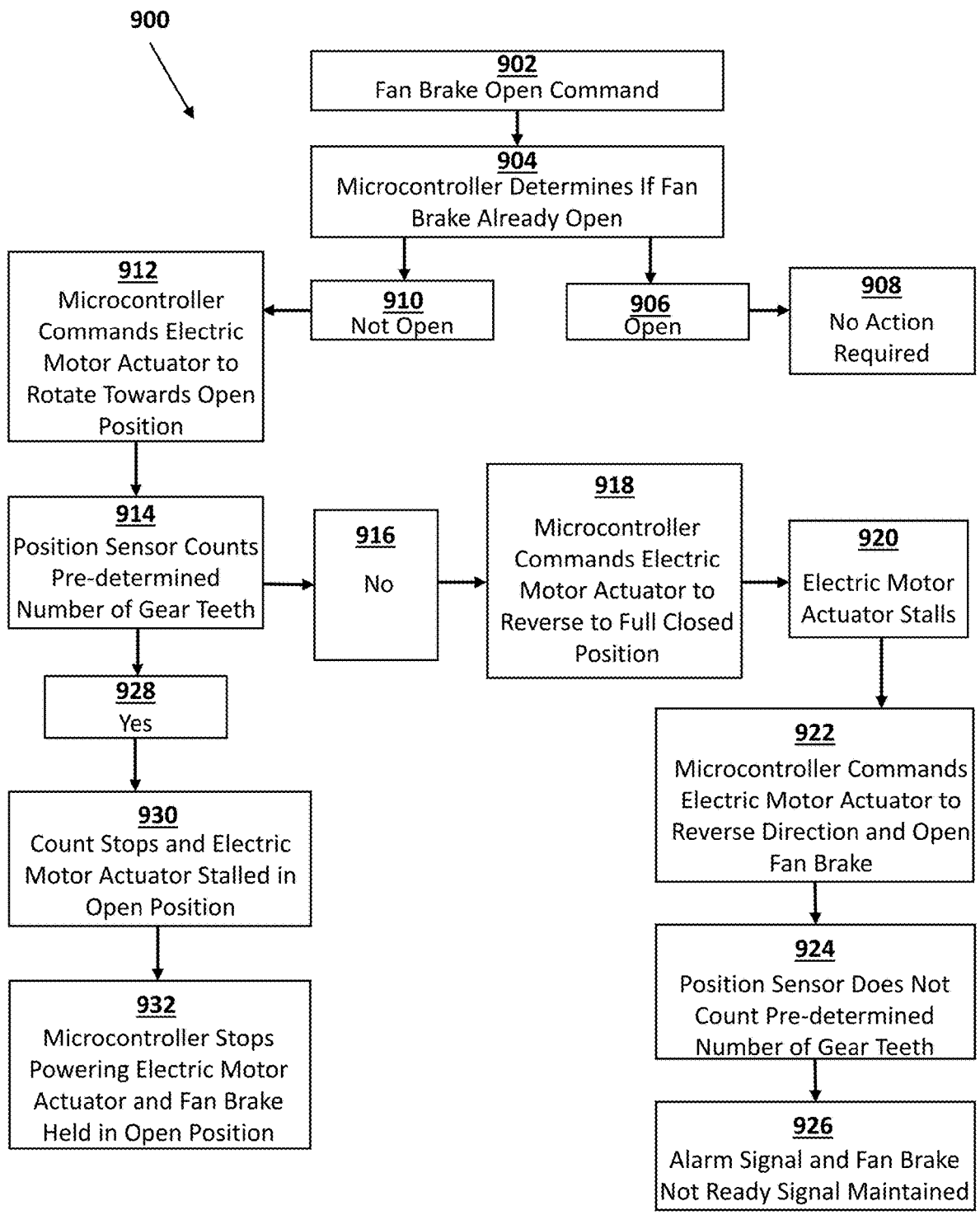
FIG. 9 illustrates a method 900 for determining open status of a fan brake control system.

FIG. 9 illustrates a method 900 for determining open status of a fan brake control system. In response to a fan brake open command 902, the microcontroller first cheeks to determine if the fan brake is already open 904. If the fan brake is already open 906, there is no further action 908. If the fan brake is not open 910, the microcontroller sends a signal to the electric motor actuator to rotate towards the open position 912. The position sensor counts the number of gear teeth that pass the sensor 914. If a pre-determined number of teeth pass 928 and then the count stops, the electric motor actuator has stalled in the fan brake open position 930. The microcontroller stops powering the electric motor actuator and the fan brake is held in the open position 932. If there is a loss of power, the fan brake remains in the open position. This is a beneficial feature, in that the system holds its position in the case of a power loss.

If the pre-determined number of gear teeth do not pass the position sensor 916, then the microcontroller sends a signal to the electric motor actuator to reverse to the full closed position 918. Once the electric motor actuator stalls and the position sensor stops counting gear teeth passing 920, the microcontroller sends a signal to the electric motor actuator to reverse direction and open the fan brake 922. If a pre-determined number of gear teeth do not pass the position sensor 924 then the alarm signal and the fan brake not ready signal are maintained 926. This is a fault condition requiring service of the fan brake. This is a beneficial feature, in that the system provides automatic fault detection of the control system and manual fan brake.

Figure 10:
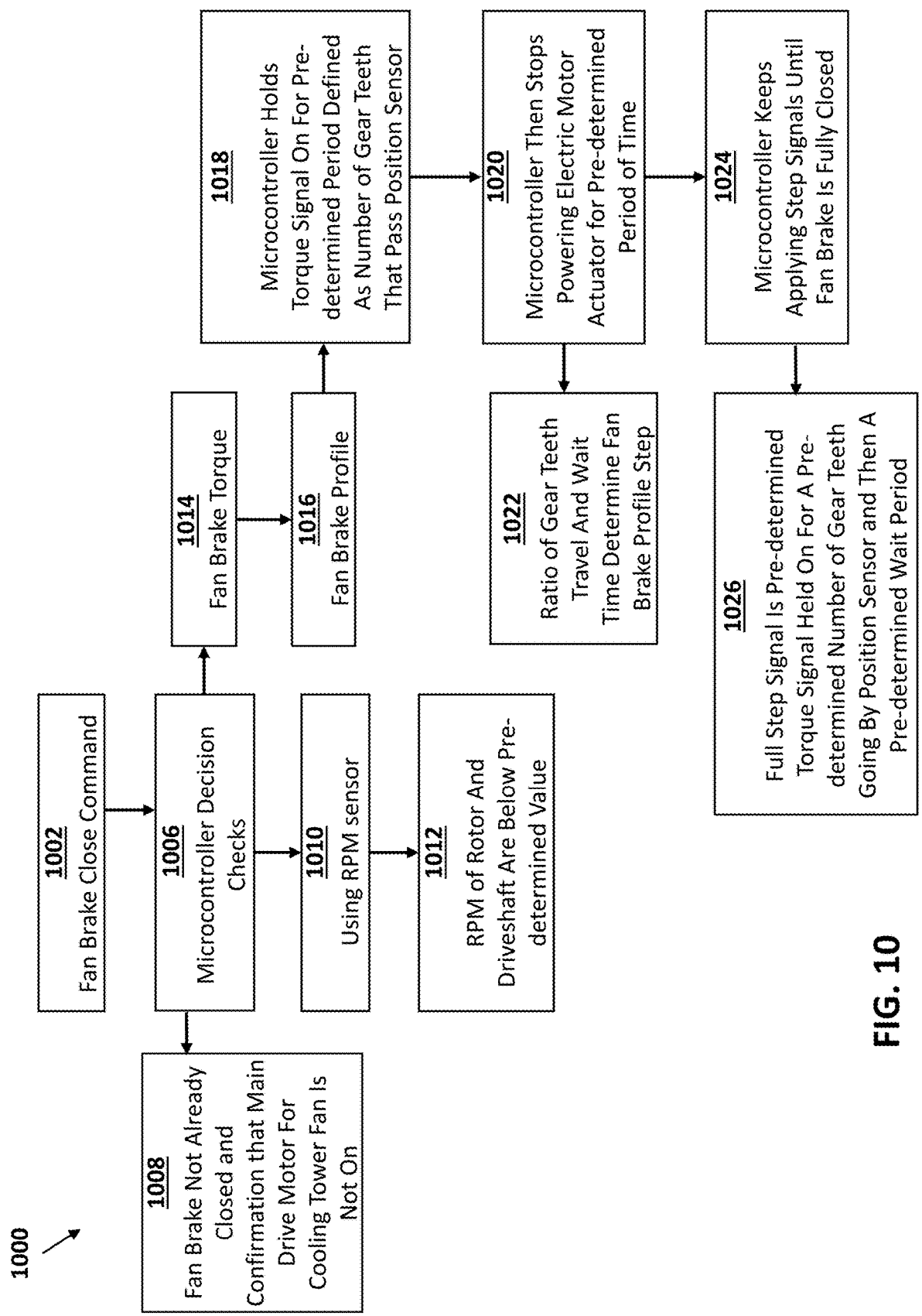
FIG. 10 illustrates a method 1000 for determining closed status of a fan brake control system.

FIG. 10 illustrates a method 1000 for determining closed status of a fan brake control system. In response to a fan brake close command 1002, the microcontroller conducts multiple decision checks 1006.

The first cheek by the microcontroller is to make sure the fan brake is not already closed and there is an additional check by the microcontroller to make sure the main drive motor for the cooling tower fan is not on 1008. The microcontroller uses the signal from the fan electric motor interface for this. This is beneficial in that it prevents the fan brake from closing when the main drive motor for the cooling tower is on.

If the optional RPM sensor is used 1010 the next cheek by the microcontroller is to determine that the RPM of the rotor and driveshaft are below a pre-determined value 1012. The RPM sensor is used for this check or a pre-determined time delay has expired that started when the main drive motor for the cooling tower fan was turned off. This allows the fan to slow naturally after it has been turned off.

The microcontroller then sends a signal to the electric motor actuator to rotate towards the close position. This is a complex signal which controls the torque with which the fan brake is closed and how smoothly the machinery being controlled is slowed and stopped as follows:

Referring now to FIGS. 4-10, another aspect of the present disclosure is a fan brake system for controlling an industrial fan system, the fan brake system including a fan brake 450 engageable with the fan system, the fan brake 450 including an actuator 814 operable to cause the fan brake 450 to selectively apply a brake force on the fan system to restrict rotational movement of the fan system. A controller 804 can be coupled to the actuator 814 of the fan brake system, the controller 804 operable to control the actuator 814. In some embodiments, the controller 804 can be communicated with the actuator 814. The controller 804 can be programmed to selectively cause the actuator 814 to apply a braking force on the fan system according to a braking profile 1016. The fan brake system can include one or more feedback sensors 806, 810, or 812 communicated with the controller 804. The controller 804 can be operable to adjust the braking profile applied to the fan system by the actuator 814 in response to receiving a feedback input from the one or more feedback sensors 806, 810, or 812.

The controller 804 can be any suitable device for controlling operation of the actuator 814, including but limited to a microcontroller, printed circuit board, an integrated control circuit, or a programmable logic controller. The controller 804 can be electrically or wirelessly communicated with the various components and/or sensors discussed herein. The controller 894 can selectively provide a control signal to the actuator 814 to control operation of the fan brake system and to control the braking force applied on a fan system.

Fan Brake Torque 1014 and Fan Brake Profiles 1016: The control signal going to the electric actuator 814 in some embodiments can be a continuous electric signal which is supplied to the actuator 814 for a predetermined amount of time corresponding to a movement of the fan brake pads 452 from a fully opened position to a fully closed position. This is beneficial in that the controller 804 can be programmed to generally provide a repeatable amount of fan brake closing torque every time the fan brake 450 closes. In such an embodiment, the braking profile 1016 can be a steady or linear increase in braking force applied to the fan system.

In other embodiments, the control signal can be a pulse width modulated signal ("PWM") with pre-determined intervals where electrical current is periodically supplied to the actuator 814 followed by a wait period where current is not supplied to the actuator 814. The total amount of time that the current is being supplied to the actuator 814 via the PWM signal can correspond to the amount of time needed for the actuator 814 to move the brake pad 452 from the opened position to the fully closed position. This automatically compensates for the wear in the brake pads. The PWM signal can produce a stepped braking profile where the braking force is increased for a period of time and then maintained constant during the waiting period. A stepped braking profile can allow the braking force applied to the fan system to be increased in increments, the waiting period allowing for the controller 804 to monitor the fan brake system to ensure that an undesirable shock load or other undesirable feedback in response to the incremental increase in the braking farce is not observed or detected before additional braking force is applied to the fan system.

In some embodiments including an electric motor as the actuator 814, the controller 804 can send an electrical control signal to the actuator 814 which can cause the electric motor to produce a torque on the actuator shaft 458 to move the brake pads 452 either towards or away from the rotor 454 at predetermined incremental distances. The torque signal can be further manipulated by the microcontroller based on feedback from a position sensor 812 to create a fan brake profile which consists of multiple fan brake profile steps. This is accomplished by the microcontroller 804 supplying current to actuator 814 until the brake pad 452 translates over a predetermined distance corresponding to a defined number of gear teeth that pass the position sensor 1018. The microcontroller 804 then stops powering the electric motor actuator 814 for a pre-determined period of time 1020. The ratio of gear teeth travel and the wait time determine the fan brake profile step 1022. The microcontroller 804 continues applying step signals until the fan brake is fully closed 1024. Again, the full step signal is the pre-determined torque signal held on for a pre-determined number of gear teeth passing the position sensor and then a pre-determined wait period 1026. This creates a complete fan brake profile which determines how quickly and how much the friction on the rotor is increased for each step. This is a slow step by step tightening of the brake pad(s) to the rotor to increase the friction and braking force applied to the rotor in incremental steps. The microcontroller can store and use multiple fan brake profiles. This matches the mass of the machinery being controlled to the control system and is beneficial to automatically slow, stop, and lock in place rotating machinery without introducing shock load that is turning at an RPM that may be much greater than zero. In other embodiments where the actuator 804 includes a hydraulic or pneumatic system, the hydraulic or pneumatic pressure can be increased at stepped intervals to produce a similar stepped braking profile 1016.

In some embodiments, the fan brake profile 1016 can include steps having varying travel distances or times. For instance it may be advantageous to have a longer step at the beginning of a braking process when the brake pad 452 is further away from the rotor 454, and decrease the step size as the brake pad 452 engages the rotor 454, as the braking force applied to fan system vs. the linear position of the brake pad 452 can increased much faster once the brake pad 452 engages the rotor 454. Additionally, the torque required by the actuator 804 can increase rapidly as the brake pad 452 engages the rotor 454 such that smaller steps can help prevent undesirable shock load or wear on the actuator 804, and particularly on a motor of an actuator 804.

In some embodiments, the feedback sensor can be an optional RPM sensor 810. The RPM sensor 810 can monitor the speed of a drive shaft 408 or another component of the fan system, and the controller 804 can adjust the braking profile 1016 for the actuator 814 according to the feedback received from the RPM sensor 810. For instance, to speed the complete closing of the fan brake 450, the microcontroller 804 can automatically reduce the wait period of the fan brake profile step to zero if the RPM sensor 810 reports the driveshaft 408 and rotor 454 have stopped turning. This action locks the fan in position as quickly as possible without introducing a shock load as the fan system is already stopped.

In some embodiments, the RPM sensor 810 can be used to monitor whether the fan system is rotating a speed that is greater than its normal operating speed, for instance in high wind situations. The braking profile 1016 can be adjusted by the controller 804 based on the RPM sensor 810 detecting a higher than normal fan system speed, in order to even more gradually apply a braking force to slowly reduce the speed of the fan system, thereby helping to avoid initial shock load on the fan brake system or the fan system.

In other embodiments, the RPM sensor 810 can be used to control the rate at which the brake pad 452 is advanced toward the rotor 454 by the actuator 814. For instance, the controller 804 can be programmed to monitor the rate at which the speed of the fan system decreases as the fan brake 450 engages the fan system. The controller 804 can be programmed to slow or stop the advancement of the brake pad 452, or reverse the direction of the brake pad 452, when the controller 804 determines that the speed of the fan system is decreasing at rate above a predetermined threshold value. Similarly, if the controller 804 determines that the rate of the decrease of the speed of the fan system is below a certain amount the controller 804 can be programmed to continue or speed up the advancement of the brake pad 452 towards the rotor 454.

One problem experienced with cooling tower fans when not powered, and not locked in place, is that the fans may rotate due to the wind load, and in some instances in a direction backward or opposite of the normal rotational direction of the fan system. When such a situation occurs, and the fan is rotating backwards, starting the main drive motor for the cooling tower fan can introduce a significant shock load that may cause damage to the fan system. The optional RPM sensor 810 is useful for alerting operators that the cooling tower fan is rotating in a reversed direction.

In some embodiments, the feedback sensor can be a fan electric motor interface 806. In some embodiments, the fan motor interface 806 can be a current sensor relay which can be communicated with the controller 804 to indicate to the controller 804 whether electric current is being supplied to the fan system. If a main drive motor for the cooling tower fan is on and the fan brake 450 is in any condition but fully open then the microcontroller 804 can send a control signal to the electric motor actuator 814 to fully open the fan brake 450 as quickly as possible. This additional safety feature is beneficial to prevent equipment damage that could occur by operating the main drive motor for the cooling tower fan with the fan brake 450 closed or engaged with the fan system of the cooling tower fan.

It is understood that while the system and method disclosed herein may work for application of the control system to a manual fan brake, the techniques described herein can be applied to other brakes or lock out devices that are operated mechanically, electrically, pneumatically, or with hydraulics. Additionally, while one embodiment of a manual fan brake is shown and described herein which applies a transverse force via brake pads on one or more lateral side of a rotor, in other embodiments the brake pads can be oriented to provide a radial or tangential force against the rotor.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in manufacturing, which in one embodiment is ±6.35 millimeters (±0.25 inches). To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A fan brake control system comprising:
a fan brake;
a position sensor;
a microcontroller;
an actuator;
an operator interface; and
a fan motor interface;
wherein the microcontroller communicates with the operator interface to provide fan brake status information and receive operator set point data;
wherein the position sensor communicates with the microcontroller;
wherein the fan motor interface communicates with the microcontroller; and
wherein the microcontroller communicates with and generates signals to the actuator to operate the fan brake.

2. The fan brake control system of claim 1, further comprising a RPM sensor.

3. The fan brake control system of claim 1, wherein the microcontroller operates the fan brake by generating signals to the actuator.

4. The fan brake control system of claim 1, wherein the microcontroller communicates with an external network.

5. The fan brake control system of claim 1, wherein the operator interface includes a brake open push button switch, a brake close push button switch, a brake opened indicator light, a brake closed indicator light, and a status indicator light.

6. The fan brake control system of claim 1, wherein the actuator is an electric motor.

7. The fan brake control system of claim 1, wherein the position sensor is a hall effect gear tooth sensor.

8. The fan brake control system of claim 1, wherein the position sensor communicates to the microcontroller how much an actuation shaft of the fan brake has been rotated by the actuator.

9. The fan brake control system of claim 2, wherein the RPM sensor is a hall effect gear tooth sensor.

10. The fan brake control system of claim 1, wherein the fan motor interface is a current sensor relay, and wherein the fan motor interface communicates to the microcontroller that a main drive motor for a fan is running.

11. A method of fan brake control comprising:
providing:
a fan brake;
a position sensor;
a microcontroller; and
an actuator;
calibrating a position of the fan brake wherein the microcontroller sends a signal to the actuator and wherein the position sensor counts a number of gear teeth in the actuator as the gear teeth pass the position sensor;
receiving a brake open command;
confirming that the fan brake is not already in an open position;
sending a signal to the actuator to rotate towards an open position;
using the position sensor to count gear teeth in the actuator; and
sending a signal to the actuator to stop rotating upon reaching a preset gear teeth count;
wherein the position sensor communicates with the microcontroller; and
wherein the microcontroller communicates with and generates signals to the actuator to operate the fan brake.

12. The method of claim 11, further comprising:
receiving a brake closed command;
confirming that the brake is not closed; and
sending a signal to the actuator to rotate toward a closed position.

13. The method of claim 11, further comprising:
utilizing an RPM sensor to determine the RPM of a fan system driveshaft and determining whether the RPM of the fan system driveshaft is below a designated value.

14. The method of claim 12, wherein at least one of the signals to the actuator is a pulse modulated signal.

15. The method of claim 14, wherein at least one of the signals is manipulated by the microcontroller according to a fan brake profile.

16. The method of claim 11 further comprising:
providing a feedback sensor;
producing a feedback input with the feedback sensor;
providing a fan braking profile;
modifying the fan braking profile with the feedback input to create am adjusted fan braking profile.

17. An automated manual fan brake for controlling a fan system including a drive shaft, comprising:
a rotor connectable to the driveshaft,
an electric actuator including a rotating actuator shaft; and
at least one brake pad;
wherein the rotating actuator shaft is connected to the at least one brake pad, and
wherein the actuator is operable to cause the at least one brake pad to engage or disengage the rotor when the rotor is connected to the driveshaft; and
wherein the actuator shaft includes a manual override input to enable a wrench to manually turn the actuator shaft and cause the at least one brake pad to engage or disengage the rotor.

18. The automated manual fan brake of claim 17, further comprising a proximal brake frame member having a threaded aperture, wherein the actuator shaft includes male shaft threads, and wherein the male shaft threads engage the proximal brake frame member threaded aperture to cause translation of the actuator shaft upon rotation of the actuator shaft.

19. The automated manual fan brake of claim 18, further comprising a proximal brake frame member, a distal brake frame member, and a base member connecting the proximal brake frame member and the distal brake frame member, wherein the proximal brake frame member and the distal brake frame member are oriented on opposite sides of the rotor, and wherein the base member translates in a direction parallel to the actuator shaft.

\* \* \* \* \*